US008842681B2

(12) United States Patent
Bachmann et al.

(10) Patent No.: US 8,842,681 B2
(45) Date of Patent: Sep. 23, 2014

(54) POLICY CONTROL IN THE EVOLVED SYSTEM ARCHITECTURE

(75) Inventors: Jens Bachmann, Langen (DE); Kilian Weniger, Langen (DE)

(73) Assignee: Panasonic Intellectual Property Corporation of America, Torrance, CA (US)

(*) Notice: Subject to any disclaimer, the term of this patent is extended or adjusted under 35 U.S.C. 154(b) by 356 days.

(21) Appl. No.: 12/088,400

(22) PCT Filed: Aug. 1, 2006

(86) PCT No.: PCT/EP2006/007610
§ 371 (c)(1),
(2), (4) Date: Sep. 11, 2008

(87) PCT Pub. No.: WO2007/039006
PCT Pub. Date: Apr. 12, 2007

(65) Prior Publication Data
US 2009/0010271 A1    Jan. 8, 2009

(30) Foreign Application Priority Data

Sep. 29, 2005 (EP) .................................... 05021319

(51) Int. Cl.
| | | |
|---|---|---|
| *H04L 12/28* | (2006.01) | |
| *H04L 29/06* | (2006.01) | |
| *H04L 29/08* | (2006.01) | |
| *H04L 12/14* | (2006.01) | |
| *H04M 15/00* | (2006.01) | |
| *H04L 29/12* | (2006.01) | |
| *H04W 76/02* | (2009.01) | |
| *H04W 8/26* | (2009.01) | |

(52) U.S. Cl.
CPC ......... *H04L 29/06027* (2013.01); *H04M 15/66* (2013.01); *H04M 2215/204* (2013.01); *H04L 61/2015* (2013.01); *H04M 15/00* (2013.01); *H04L 65/1006* (2013.01); *H04M 2215/0152* (2013.01); *H04L 67/14* (2013.01); *H04L 65/1043* (2013.01); *H04L 29/12226* (2013.01); *H04L 61/6022* (2013.01); *H04W 76/02* (2013.01); *H04L 12/14* (2013.01); *H04L 29/12839* (2013.01); *H04M 15/80* (2013.01); *H04W 8/26* (2013.01); *H04L 65/80* (2013.01)
USPC ........... 370/401; 370/230; 370/235; 370/341; 370/349; 370/389; 370/395.2; 370/395.3; 370/469

(58) Field of Classification Search
None
See application file for complete search history.

(56) References Cited

U.S. PATENT DOCUMENTS

| | | | | |
|---|---|---|---|---|
| 5,367,573 | A * | 11/1994 | Quimby | 713/167 |
| 6,621,793 | B2 * | 9/2003 | Widegren et al. | 370/230.1 |
| 7,346,059 | B1 * | 3/2008 | Garner et al. | 709/242 |
| 2003/0046407 | A1 | 3/2003 | Erickson | |
| 2003/0229699 | A1 | 12/2003 | Moran | |
| 2004/0187021 | A1 * | 9/2004 | Rasanen | 713/200 |
| 2004/0196840 | A1 | 10/2004 | Amrutur | |
| 2005/0226256 | A1 | 10/2005 | Ando | |
| 2007/0081512 | A1 | 4/2007 | Takeda | |

FOREIGN PATENT DOCUMENTS

| | | |
|---|---|---|
| CN | 1229566 | 9/1999 |
| JP | 11-032078 | 2/1999 |
| JP | 2000-315997 | 11/2000 |
| JP | 2004-312416 | 11/2004 |
| JP | 2004-312734 | 11/2004 |
| WO | 97/36450 | 10/1997 |
| WO | 2005/006674 | 1/2005 |

OTHER PUBLICATIONS

"Digital Cellular Telecommunications System (Phase 2+); Universal Mobile Telecommunications systems (UMTS); Policy Control over Go Interface (3GPP TS 29.207 version 6.3.0 Release 6); ETSI TS 129 207," ETSI Standards, European Telecommunications Standards Institute, vol. 3-CNS3, No. V630, Mar. 2005, p. 12, line 1-p. 14, line 37.

Signalling flow for Policy Control in the evolved System Architecture

3GPP, ETSI, TS 29.207, Version 6.3.0, Release 6, GSM (Global System for Mobile Communications), "Digital Cellular Telecommunications System (Phase 2+); Universal Mobile Telecommunications System (UMTS); Policy Control over Go interface," Mar. 2005, p. 1-60.

Chinese Office Action dated May 27, 2010 with English Translation.

International Search Report dated Nov. 3, 2006.

Notice of Reason for Rejection dated Jan. 29, 2013, with English translation.

\* cited by examiner (Continued)

*Primary Examiner* — Faruk Y Hamza

*Assistant Examiner* — Aixa A Guadalupe Cruz

(74) *Attorney, Agent, or Firm* — Dickinson Wright PLLC

(57) ABSTRACT

The invention relates to a method and system for policy control in a data packet network comprising a user equipment, a gateway and a home policy control node. The method comprises the steps of establishing a session between the user equipment and an application function. Then a session identifier is generated by the user equipment, and the same session identifier is generated by the home policy control node. The user equipment requests bearer establishment from the data packet network and marks bearer establishment packets with said session identifier. The gateway derives a user equipment identifier from the bearer establishment packets and determines policy decisions based on the session identifier and the user equipment identifier. The user equipment marks data packets sent over the established bearer with the session identifier; and the gateway applies policy and charging information for the session to the marked data packets.

17 Claims, 6 Drawing Sheets

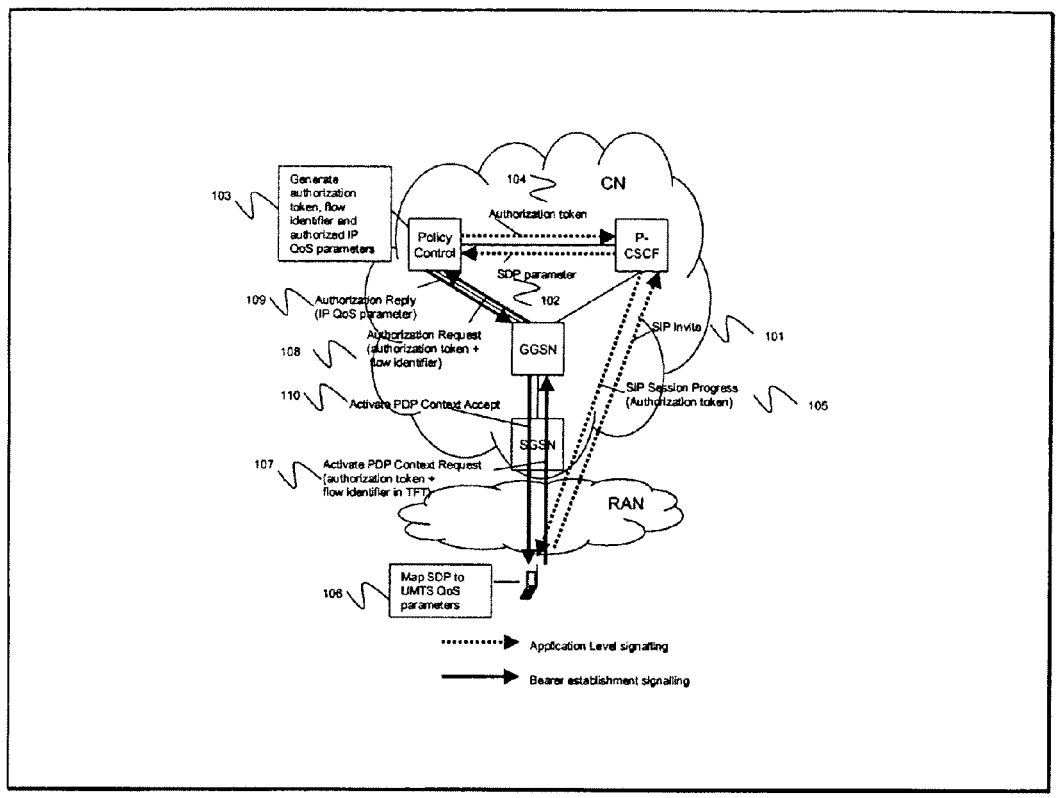
Figure 1: Bearer authorization with SBLP

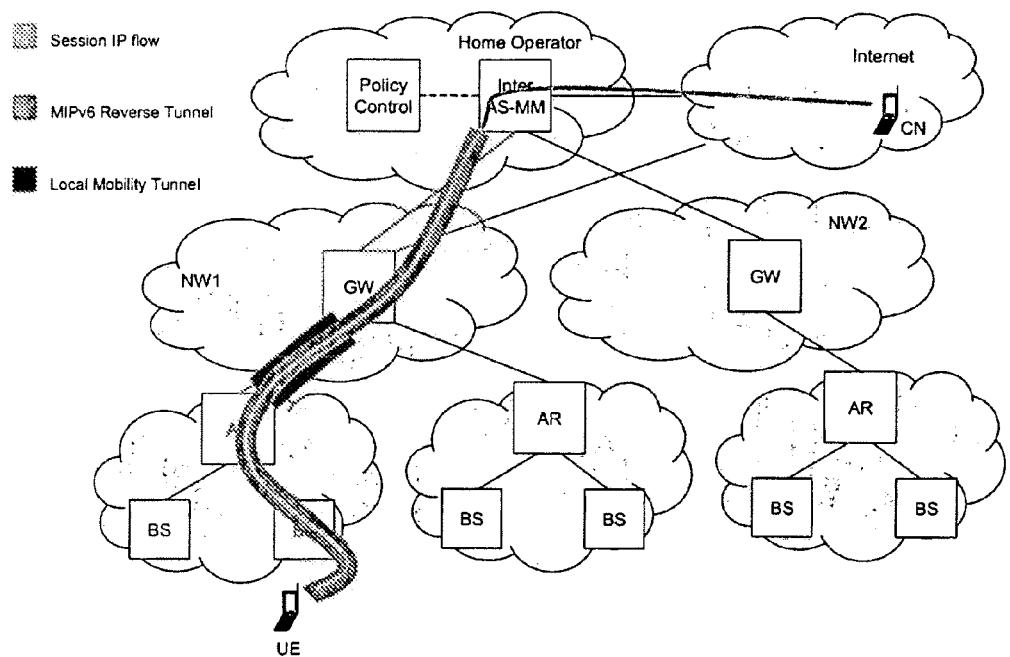
Figure 2: Example of IP flows and tunnels in the evolved System Architecture with traffic routed over inter AS MM

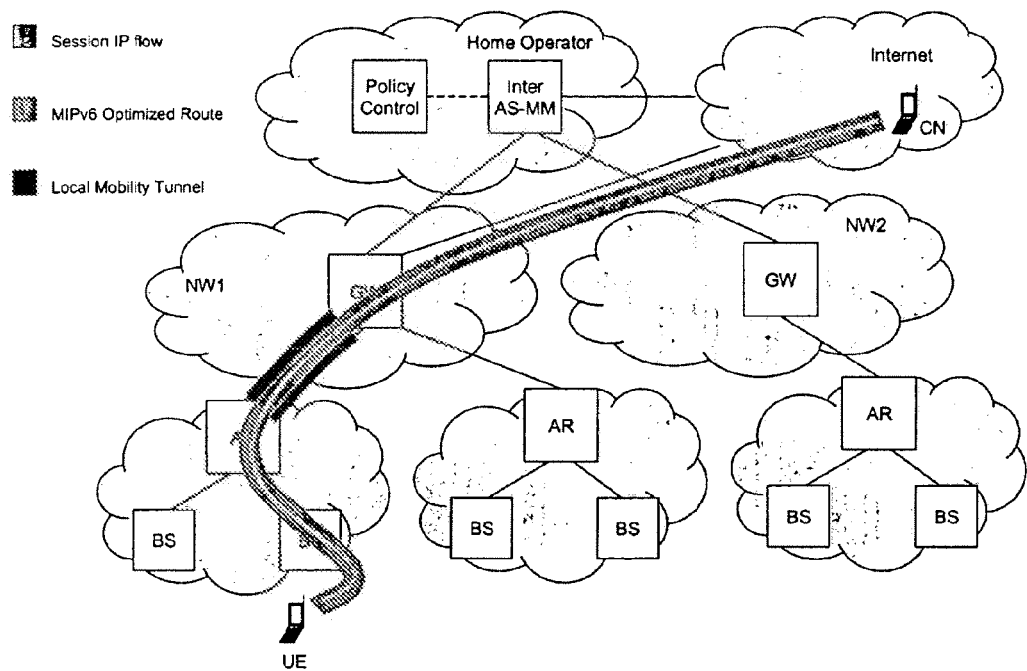
Figure 3: Example of IP flows and tunnels in the evolved System Architecture with optimized traffic routes

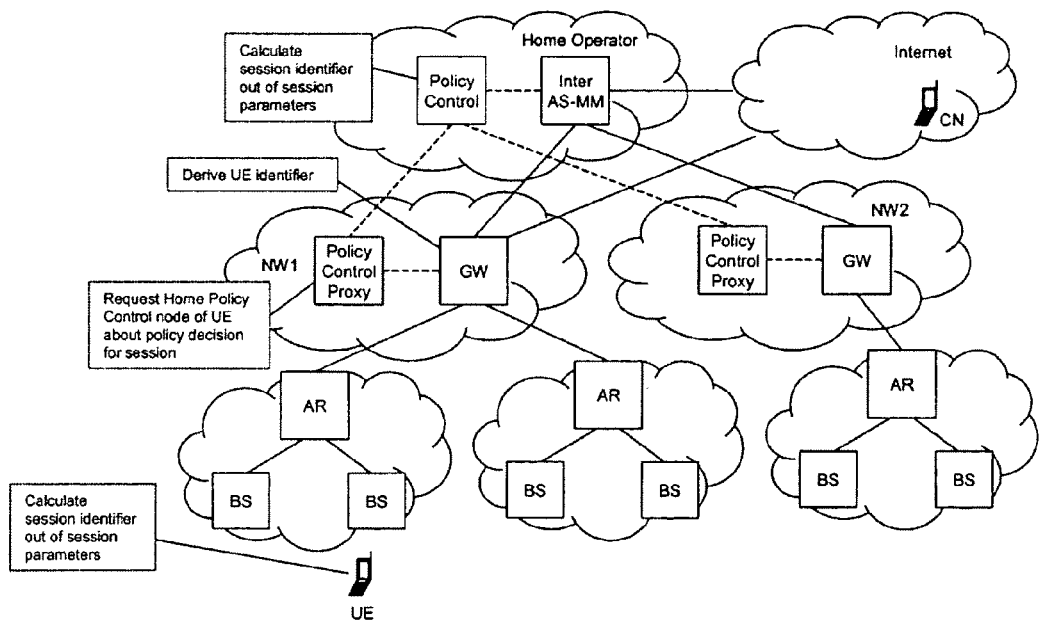
Figure 4: Entities and functionalities for Policy Control in the evolved System Architecture

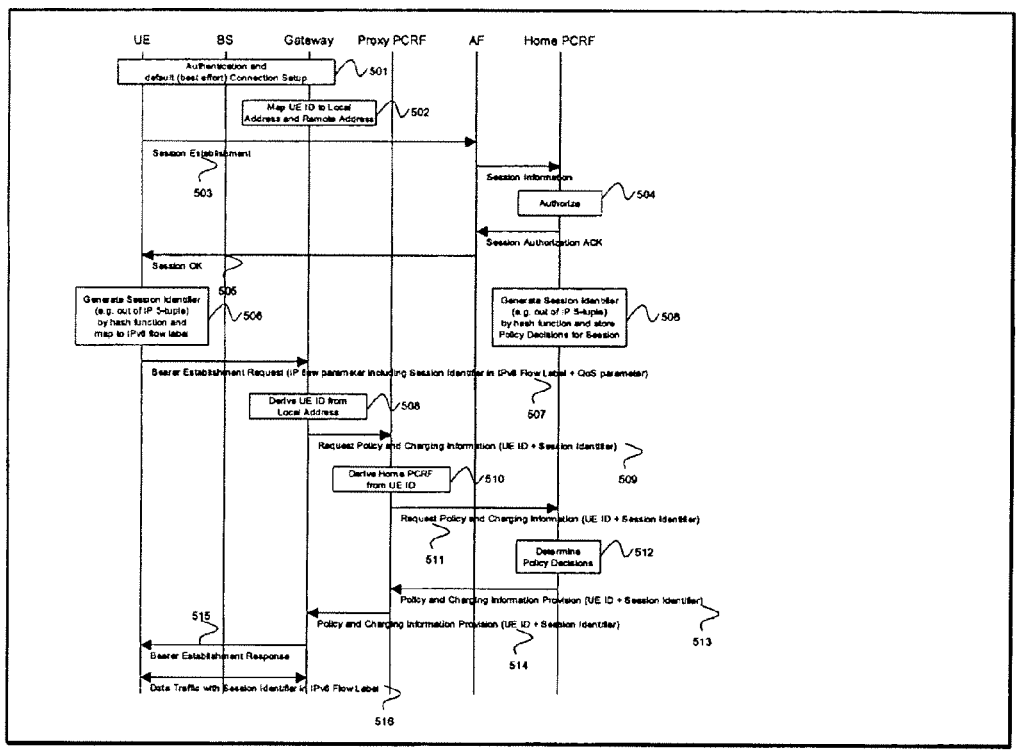
Figure 5: Signalling flow for Policy Control in the evolved System Architecture

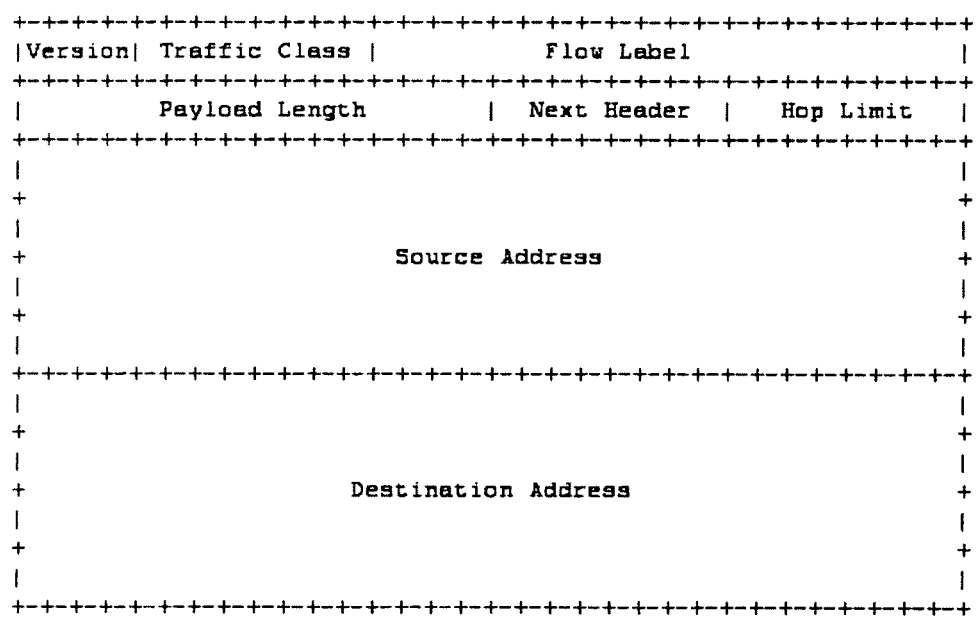
Figure 6: IPv6 header

POLICY CONTROL IN THE EVOLVED SYSTEM ARCHITECTURE

The invention relates to a method and system for policy control in a data packet network.

In UMTS (Universal Mobile Telecommunication System) with its packet switched core network the services that can be offered constitute an advantage over the circuit switched mobile telephony systems, such as GSM (Global System for Mobile communication). For example a video or speech call requires guaranteed Quality of Service (QoS), while non real-time packet data can be offered on a best effort basis. This improvement in the variety of services offered has to be managed appropriately by the network, which has been the topic of standardisation meetings is the past.

3GPP (Third Generation Partnership Project) has implemented a Policy Control Architecture in Release 5 to allow Service Based Local Policy (SBLP) for IP Multimedia Subsystems (IMS). With SBLP the control plane (e.g. the IMS) can authorize and control the bearer traffic based on the Session Description Protocol (SDP) parameters negotiated at the session establishment. The binding between bearer and service is based on the Authorization Token mechanism. The Authorization Token mechanism requires support by the application session signalling and bearer setup signalling.

In Release 6 the SBLP was separated from IMS, i.e. the Policy Control node is not a logical element of the Proxy Call Session Control Function (P-CSCF) anymore and SBLP is also possible for other applications. The SBLP functions performed at the involved entities and the signalling messages between them are shown in FIG. 1.

In Release 6 Flow Based Charging (FBC) was introduced having similar functionalities as SBLP, e.g. providing flow filters and rules to the Gateway.

In the Release 7 Work Item on Policy Control and Charging the full harmonization of SBLP and FBC is studied. In addition it is studied whether the Authorization Token can be removed and therefore other mechanisms for binding bearers to services are already proposed.

For beyond Release 7 the evolution of the System Architecture is studied within 3GPP. The target is to have a higher-data-rate, lower-latency, packet-optimized system that supports multiple Radio Access Technologies (RATs).

One of the high level architecture proposals comprises an inter Access System Mobility Management (inter AS MM) entity, e.g. a MIPv6 (Mobile Internet Protocol version 6) Home Agent, with multiple connected Access Systems. The different Access Systems can support different Access Technologies and also belong to different network operators. Within the Access Systems a Gateway provides IP connectivity to the terminal, and therefore the terminal can establish a connection to the inter AS MM in its home network or directly to a correspondent node by means of optimized routing.

In FIG. 2 and FIG. 3 a high level architecture with possible IP and tunneling flows is shown. In addition to the Session IP flow and the tunnel between the terminal and the inter AS MM another tunnel is shown, that is a local mobility tunnel between the Base Station and the Gateway.

The general motivation is to perform Policy Control in the evolved System Architecture. One option is to have the Policy Control node connected to the inter AS MM similar to today's 3GPP Policy Control mechanism at the GGSN (Gateway GPRS Serving Node). The problem is that in case of Route Optimization the inter AS MM is not on the path of the user data traffic, and hence it would not be possible to perform Policy Control for route optimized traffic. Further, if Policy Control only occurs at the inter AS MM it would not be possible in a roaming scenario for the operator of the visited network to get involved in the Policy Control process.

To overcome the above limitations the Gateway should be connected to a Policy Control node as well, in addition to the inter AS MM. For this, a Proxy Policy Control node between the Gateway and the Home Policy Control node can be introduced. The Gateway sends the request to the Proxy Policy Control node and the Proxy Policy Control node forwards the request to the Home Policy Control node.

From the requirement to perform Policy Control at the Gateway new problems arise. The traffic between the mobile terminal (UE) and the Correspondent Node can be tunneled (e.g. reverse tunneled to the Home Agent in case of MIPv6) or address swapped (e.g. the IP addresses and ports are replaced for local mobility management procedures) or routed using the IPv6 routing extension header (MIPv6 type 2 routing header) or the home address option in the IPv6 destination option extension header (e.g. in home address option in MIPv6) or a combination thereof. That means both the data packets and the Bearer Request received on the Gateway have IP flow parameters (IP source/destination address/port) of the IP tunnel e.g. between inter AS MM and UE. On the other hand the Policy Control node in the home network makes its policy decisions during session establishment for the original IP flow between UE and correspondent node, e.g. with the home IP address of the UE as source address and the IP address of the correspondent node as destination address. Thus the IP flow parameters at the Gateway are useless to the Home Policy Control node as the Home Policy Control node cannot map the IP flow parameter of the tunnel to the application level IP flow parameter.

One possibility for the Gateway could be to look into the IP flow within the tunnel to get the appropriate IP flow parameters available at the Home Policy Control node and to use only these parameters in the communication with the Home Policy Control node. But this is only possible in case the tunnel is not encrypted (e.g. by IPSec). Furthermore the processing at the Gateway would be increased dramatically if the Gateway were to look into every packet.

Another option is to re-use the Authorization Token mechanism. But this mechanism is specific to Session Initiation Protocol (SIP) based applications and needs to be supported by the application-level signalling. Further it needs to be supported by the bearer establishment signalling (e.g. in GPRS), and is therefore also specific to the bearer establishment signalling. Thus it is not applicable to other applications and Access Systems without modifications.

It is an object of the current invention to perform Policy Control in the Evolved System Architecture without adding to the processing overhead at the Gateway.

The object is solved by the subject matter of the independent claims. Advantageous embodiments of the invention are subject matters to the dependent claims.

The invention relates to a method for policy control in a data packet network comprising a user equipment, a gateway and a home policy control node. The method comprises the steps of establishing or modifying a session between the user equipment and an application function. Then a session identifier is generated by the user equipment, and the same session identifier is independently generated by the home policy control node. The user equipment requests bearer establishment or modification from the data packet network and marks bearer establishment or modification packets with said session identifier. The gateway derives a user equipment identifier from the bearer establishment packets and determines policy decisions based on the session identifier and the user equipment identifier. The user equipment marks data packets sent over the established or modified bearer with the session identifier; and the gateway applies policy and charging information to the marked data packets of the session.

In an advantageous embodiment of the invention the marking of data packets and bearer establishment or modification packets with the session identifier uses the flow label field of an outer IPv6 header of said data packets.

It is an advantage in a further embodiment of the invention that a hash function is used in the steps of generating the session identifier by the user equipment and generating the session identifier by the home policy control node.

According to another advantageous embodiment the hash function uses source and destination addresses and source and destination port numbers of the session as input parameters.

In a further advantageous embodiment the gateway carries out the following sub-steps in the step of determining the policy decision: determining the home policy control node from the user equipment identifier; requesting the policy and charging information for the session from the home policy control node, the request including the session identifier and the user equipment identifier; and receiving the policy and charging information for the session from the home policy control node.

In a variation of this embodiment the step of determining the policy decision comprises the following sub-steps carried out by a proxy policy control node: receiving from the gateway the session identifier and the user equipment identifier; determining the home policy control node from the user equipment identifier; requesting the policy and charging information for the session from the home policy control node, the request including the session identifier and the user equipment identifier; receiving the policy and charging information for the session from the home policy control node; and forwarding the policy and charging information for the session to the gateway.

A further advantageous embodiment comprises the step of mutually authenticating the user equipment and the data packet network before establishing or modifying a session between the user equipment and the application function.

According to another advantageous embodiment the gateway receives the user equipment identifier during the step of mutually authenticating the user equipment and the data packet network.

A further advantageous embodiment further comprises the step of assigning a local address to the user equipment after or before the step of mutually authenticating the user equipment and the data packet network.

According to another advantageous embodiment the gateway receives the mapping between the user equipment identifier and the local address assigned to the user equipment.

In another advantageous embodiment the step of deriving by the gateway the user equipment identifier uses mapping between the local address of the user equipment and the user equipment identifier.

It is further advantageous that the step of deriving by the gateway the user equipment identifier comprises deriving the local address of the user equipment from a source address of the bearer establishment or modification packets.

According to an advantageous embodiment a system for policy control in a data packet network comprises user equipment adapted to establish a session between the user equipment and an application function, and to generate a session identifier. It also comprises a home policy control node adapted to generate a session identifier; said session identifier generated by the user equipment and said session identifier generated by the home policy control node being the same. Further, the user equipment requests bearer establishment or modification from the data packet network and marks bearer establishment or modification packets with said session identifier. A gateway is adapted to derive a user equipment identifier from the bearer establishment or modification packets, and to determine policy decisions based on the session identifier and the user equipment identifier. The user equipment also marks data packets sent over the established or modified bearer with the session identifier; and the gateway applies policy and charging information for the session to the marked data packets.

In the following, the invention is described in more detail with reference to the attached figures and drawings.

FIG. 1 shows the messages and functions during bearer authorization with SBLP in 3GPP Release 6;

FIG. 2 shows the high level architecture of the evolved 3GPP System Architecture with some example IP flows and tunnels where the traffic is routed over the inter AS MM;

FIG. 3 shows the high level architecture of the evolved 3GPP System Architecture with some example IP flows and tunnels where the traffic is optimized routed and is not going over the inter AS MM;

FIG. 4 shows the entities and functionalities for Policy Control in the evolved System Architecture;

FIG. 5 shows the signalling flow for Policy Control in the evolved System Architecture; and FIG. 6 shows an IPv6 header.

The following paragraphs will describe various embodiments of the invention. For exemplary purposes only, most of the embodiments are outlined in relation to a UMTS communication system and the terminology used in the subsequent sections mainly relates to the UMTS terminology. However, the terminology used and the description of the embodiments with respect to a UMTS architecture is not intended to limit the principles and ideas of the inventions to such systems.

Also the detailed explanations given in the Technical Background section above are merely intended to better understand the mostly UMTS specific exemplary embodiments described in the following and should not be understood as limiting the invention to the described specific implementations of processes and functions in the mobile communication network.

The present invention relates to transfer of policy and charging information to a gateway in a mobile communication system. Policy and charging information for an application session (comprising at least one IP flow) of a mobile terminal negotiated during application session establishment are transferred to a Gateway. The Gateway requires the policy and charging information to control the data packets encapsulated in a tunnel between the mobile terminal and the correspondent node.

The UE and the Home Policy Control node independently generate an identical unique application session identifier using at least some information out of the application level IP flow parameters. In the Policy Control node the application session identifier refers to the appropriate stored policy and charging information. In the bearer establishment/modification signalling and the (tunneled) user data transport between the UE and the Gateway the generated session identifier is included in the IPv6 flow label field of the IPv6 headers.

When receiving the bearer establishment/modification messages, the Gateway derives a UE identifier, e.g. by looking up the IP source address of the messages in a table containing the IP addresses that were assigned to UEs during network authentication.

Then the Gateway includes the UE identifier and session identifier in the signalling to the Proxy/Home Policy Control node and therefore the Home Policy Control node can identify the UE and session and return the policy decisions to the requesting Gateway.

In order to establish a connection to a wireless network mutual authentication is needed between the UE and the network. During this authentication process the UE sends an UE identifier (e.g. IMSI (International Mobile Subscriber Identity), NAI (Network Access Identifier)) in signalling messages to the Gateway of the network.

After or before the UE is authenticated it needs a local IP address (Care-of Address) to be reachable within the current network, and further this IP address must belong topologically to the current network. The local IP address can be assigned stateful by a server (e.g. by DHCP) or generated stateless by the UE. Beside that in a network with a hierarchical mobility management (e.g. HMIP) several local, or regional and local IP addresses might be possible, whereas the hierarchical mobility management might also be hidden, respectively transparent to the UE, by the Base Station (BS) or Access Point (AP) allocating the local IP address for the UE.

If stateful or transparent address allocation is used, the UE is identified towards the address assigning server during the allocation procedure. Thus there is a mapping established in the network between the UE identifier and the locally assigned address. If the address is not assigned directly by the Gateway, the mapping between the UE identifier and the local IP address must be made available to the Gateway by the corresponding address assigning network entity (e.g. DHCP (Dynamic Host Configuration Protocol) server).

After completion of the connection establishment, authentication and address allocation the UE registers the local IP address with the inter AS MM (e.g. home agent). That means the traffic to/from the UE from/to correspondent nodes is transferred through a tunnel between the UE and the inter AS MM.

Now the user can establish an application session, e.g. a VoIP call via SIP, and SDP. Here it must be taken into account that the address used by the application as destination/source of the session is the home IP address of the UE and not a local IP address. The application level signalling messages are going over an Application Function (AF) in the home network, e.g. SIP proxy or respectively P-CSCF in case of IMS. During the session establishment the session information together with the UE identifier are forwarded to the Policy Control node (PCRF) in the home network to authorize the IP flows of the session. The PCRF sends the result of the authorization procedure back to the AF and the AF informs the UE about the result of the application session establishment.

After the application session is authorized and the IP flow parameters are negotiated, the UE and the Home Policy Control node generate independently an identical unique application session identifier using at least some information out of the application level IP flow parameters. For example the IP source/destination addresses and source/destination port numbers are used in a hash function to calculate the application session identifier. A hash function is a transformation that takes a variable-size input and returns a fixed-size string. The hash function used is identical in the UE and in the Home Policy Control node and can be integrated in the USIM of the UE. The Home Policy Control node is using the generated application session identifier as an index in a database to refer to the policy and charging rules determined for the application session.

In the next step the resources for the application session must be established in the network. For this the UE has to set up resources for the tunnel towards the inter AS MM or, in case of a supported optimized routing mechanism, the path between the UE and the correspondent node. The resource reservation signalling messages are also received by the Gateway which is located in between the UE and the inter AS MM or in between the UE and the correspondent node, respectively. In case policy decisions are also required at the Gateway, e.g. because of optimized routing or because of roaming and visited network operator charging or QoS control requirements, the Gateway must be informed about the policy decisions made at the PCRF in the home network. In addition to the tunnel between the UE and the correspondent node there might be another tunnel e.g. between the BS and the Gateway because of local mobility management. Also for this local mobility management the tunnel resources must be set up.

In order to enable the Gateway to get and apply the correct policy decisions, the UE includes the generated session identifier in the IPv6 flow label field of the IPv6 header of the resource reservation messages and the outer header of the user data as well. Then the Gateway can derive the corresponding UE identifier out of the local IP address used in the outer header because of the established matching during local IP address assignment.

The IPv6 header, as shown in FIG. 6, has several advantages over the IPv4 header, including the inclusion of flow labelling. This 20 bit flow label field is used for specifying special router handling from source to destination for a sequence of packets. This can be done by tagging packets of a specific flow to differentiate the packets at the network layer. With this label, a router need not check deep into the packet to identify the flow, because this information is available in the IP packet header. The flow label allows the applications on the end system to easily differentiate the traffic at the IP layer, making it easier to provide QoS for packets that have been encrypted by IPSec, the security architecture that provides protection for IP datagrams.

If there is a Proxy Policy Control node connected to the Gateway, the Gateway forwards the UE identifier and the session identifier to the Proxy Policy Control node. If there is no Proxy Policy Control node, the Gateway can also perform the following steps by itself. The Proxy Policy Control node derives the Home Policy Control node out of the UE identifier. For example if a NAI is used to identify the user, the realm part can be used to construct a Fully Qualified Domain Name (FQDN) of the Home Policy Control node and DNS can be used to resolve the IP address. Then a request with the UE identifier and the session identifier is sent to the Home Policy Control node to ask for the policy and charging rules for the session.

The Home Policy Control node can identify the appropriate policy and charging information for the session on account of the identifiers in the request. The policy and charging information are included in a reply sent to the Proxy Policy Control node. The Proxy Policy Control node can then modify the policy and charging information due to local policy rules and forwards the final policy and charging information to the Gateway.

The functions of the entities involved in the policy and charging control procedure are shown in FIG. 4.

The signalling flow between the entities involved in the policy and charging control procedure is shown in FIG. 5.

During the initial Access Authentication the Gateway obtains 501 the UE identifier (e.g. IMSI). The Gateway stores the mapping 502 of the local assigned IP address to the UE identifier. The UE establishes 503 a session; the signalling messages are routed to an Application Function (e.g. SIP-Proxy). The AF requests the PCRF in the home network of the UE to authorize 504 the session. The AF sends a message to the UE to inform 505 the UE about the success of the session establishment.

To identify the IP session, the UE and the Home Policy Control node use for example the source/destination address/port of the session IP flow and calculate 506 a unique identifier for the application session (e.g. by a common hash function).

In the bearer establishment request 507 from the UE to the Gateway, the UE includes the generated session identifier in the IPv6 flow label field. The bearer establishment can continue from the Gateway to the inter AS MM or Correspondent Node depending on the bearer establishment mechanism used. The Gateway derives 508 the UE identifier from the local IP address. The Gateway sends a request 509 to the local Proxy Policy Control node with the UE identifier and session identifier (Access Network identifier can also be included to perform access aware policy control). From the UE identifier the Proxy Policy Control node determines 510 the Home Policy Control node. The Proxy Policy Control node requests 511 the Home Policy Control node for policy and charging information for the Session of the UE. The Home Policy Control node looks up 512 the entry in its policy database belonging to the appropriate session identifier. The Home Policy Control node sends the stored policy and charging information in a reply 513 to the Proxy Policy Control node. The Proxy Policy Control node sends 514 the policy and charging information to the Gateway. The Gateway sends a response 515 about the established bearer to the UE.

The tunneled packets in the data traffic 516 between the UE and the Gateway are marked with the appropriate calculated IPv6 flow label.

The above procedure is based on the assumption that the UE initiates the resource establishment. But also if the resource establishment is initiated by the inter AS MM or by the correspondent node the policy control can be performed if the appropriate application session identifier is included in the packet headers.

Furthermore for Policy and Charging Control in the home network the Inter AS MM must also request the Policy Decisions from the Home PCRF. This can be performed similar to the functions performed at the Gateway.

Also in case of resource modifications of already established resources or other related signalling messages the flow label field should be marked with the generated application session identifier.

The mapping of the policy and charging information to the tunneled data packets is possible because of a unique application session identifier generated independently in the mobile terminal and in a Policy Control node in the home network. The application session identifier is included in a field of the header of the resource set up messages and in the outer header of the tunneled application session data packets.

Another embodiment of the invention relates to the implementation of the above described various embodiments using hardware and software. It is recognized that the various above mentioned methods may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for policy control in a data packet network comprising a user equipment, an intermediate gateway, a home gateway and a home policy control node, the method comprising the steps of:
    establishing an encrypted data packet tunnel between the user equipment and the home gateway;
    establishing an IP flow session by the user equipment;
    generating a data packet marking identifier for the IP flow session by the user equipment;
    generating another data packet marking identifier by the home policy control node, said data packet marking identifier generated by the user equipment and said other data packet marking identifier generated by the home policy control node being the same;
    determining policy and charging decisions for the IP flow session by the intermediate gateway;
    sending by the user equipment data packets of the IP flow session in the encrypted data packet tunnel to the home gateway;
    marking by the user equipment an outer header of the encrypted and tunneled data packets of the IP flow session with the data packet marking identifier; and
    applying by the intermediate gateway the policy and charging decisions to the marked data packets, wherein:
    in the steps of generating the data packet marking identifier by the user equipment and generating the other data packet marking identifier by the home policy control node source and destination addresses and source and destination port numbers of the IP flow session are used as input parameters.

2. The method according to claim 1, wherein the marking of the outer header of the encrypted and tunneled data packets with the data packet marking identifier comprises using a flow label field of an outer IPv6 header of said data packets.

3. The method according to claim 1, wherein the step of determining the policy and charging decisions comprises the following sub-steps carried out by the intermediate gateway:
    determining the home policy control node from a user equipment identifier;
    requesting policy and charging information for the IP flow session from the home policy control node, the request including the data packet marking identifier and the user equipment identifier; and
    receiving the policy and charging information for the IP flow session from the home policy control node.

4. The method according to claim 1, wherein the step of determining the policy and charging decisions comprises the following sub-steps carried out by a proxy policy control node:
    receiving from the intermediate gateway the data packet marking identifier and a user equipment identifier;
    determining the home policy control node from the user equipment identifier;
    requesting policy and charging information for the IP flow session from the home policy control node, the request including the data packet marking identifier and the user equipment identifier;
    receiving the policy and charging information for the IP flow session from the home policy control node; and forwarding the policy and charging information for the IP flow session to the intermediate gateway.

5. The method according to claim 1, wherein the intermediate gateway receives a user equipment identifier during a step of mutually authenticating the user equipment and the data packet network.

6. The method according to claim 1, further comprising the step of assigning a local address to the user equipment after or before a step of mutually authenticating the user equipment and the data packet network.

7. The method according to claim 6, further comprising the step of receiving by the intermediate gateway a mapping between a user equipment identifier and the local address assigned to the user equipment.

8. The method according to claim 7, further comprising the step of deriving by the intermediate gateway the user equipment identifier using the mapping between the local address of the user equipment and the user equipment identifier.

9. The method according to claim 6, further comprising the step of deriving by the intermediate gateway the user equipment identifier by deriving the local address of the user equipment from a source address of bearer establishment or modification packets by using a mapping between the local address and a user equipment identifier.

10. A system for policy control in a data packet network comprising user equipment, a home policy control node, a home gateway and an intermediate gateway, wherein:
the user equipment is configured to establish an encrypted data packet tunnel with the home gateway;
the user equipment is further configured to establish an IP flow session, and to generate a data packet marking session identifier for the IP flow session;
the home policy control node is configured to generate another data packet marking identifier, said data packet marking identifier generated by the user equipment and said other data packet marking identifier generated by the home policy control node being the same;
the intermediate gateway is configured to derive a user equipment identifier from bearer establishment or modification packets, and to determine policy and charging decisions for the IP flow session based on the data packet marking identifier and the user equipment identifier;
the user equipment is further configured to send data packets of the IP flow session in the encrypted data packet tunnel to the home gateway;
the user equipment is further configured to mark an outer header of the encrypted and tunneled data packets of the IP flow session with the data packet marking identifier; and
the intermediate gateway is further configured to apply the policy and charging decisions to the marked data packets, wherein:
the user equipment and the home policy control node use source and destination addresses and source and destination port numbers of the IP flow session as input parameters.

11. An intermediate gateway in a data packet network, the intermediate gateway comprising:
a policy decision determining unit to determine policy and charging decisions for an IP flow session; and
a policy and charging decision application unit to apply the policy and charging decisions to data packets marked by a user equipment with a data packet marking identifier, said data packet marking identifier being identical to a data packet marking identifier generated by a home policy control node, wherein:
source and destination addressed and source and destination port numbers of the IP flow session are used as input parameters.

12. The intermediate gateway according to claim 11, wherein the intermediate gateway is further configured to:
determine the home policy control node from a user equipment identifier;
request policy and charging information for the IP flow session from the home policy control node, the request including the data packet marking identifier and the user equipment; and
receive the policy and charging information for the IP flow session from the home policy control node.

13. The intermediate gateway according to claim 11, wherein the intermediate gateway is configured to use a mapping between a local address of user equipment and a user equipment identifier to derive the user equipment identifier.

14. The intermediate gateway according to claim 11, wherein the intermediate gateway is further configured to derive a local address of user equipment from a source address of the bearer establishment or modification packets.

15. A user equipment in a data packet network, the user equipment being configured to establish an IP flow session and an encrypted data packet tunnel between the user equipment and a home gateway, the user equipment comprising:
a data packet marking identifier generation unit to generate a data packet marking identifier for the IP flow session, said data packet marking identifier being identical to a data packet marking identifier generated by a home policy control node; and
a data packet marking unit to mark an outer header of encrypted and tunneled data packets of the IP flow session with the data packet marking identifier, wherein:
the user equipment and the home policy control node are configured to use source and destination addresses and source and destination port numbers of the IP flow session as input parameters.

16. The user equipment according to claim 15, wherein the user equipment is assigned a local address after or before mutually authenticating the user equipment and the data packet network.

17. A home policy control node in a data packet network, the home policy control node being configured to generate a data packet marking identifier, the home policy control node comprising:
a data packet marking identifier generation unit to generate said data packet marking identifier so that said data packet marking identifier generated by the home policy control node is the same as another data packet marking identifier generated by a user equipment, wherein:
the home policy control node and the user equipment are configured to use source and destination addresses and source and destination port numbers of a session as input parameters.

* * * * *